April 6, 1948.  G. A. BORG  2,439,199
COUPLING DEVICE
Filed July 7, 1944  3 Sheets-Sheet 1

INVENTOR.
GUSTAVE A. BORG
BY
ATTORNEY.

April 6, 1948.  G. A. BORG  2,439,199
COUPLING DEVICE
Filed July 7, 1944   3 Sheets-Sheet 2
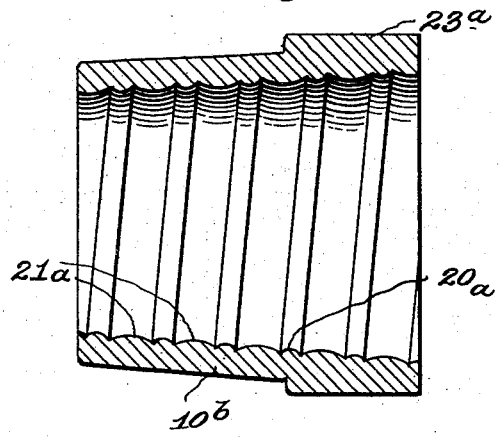
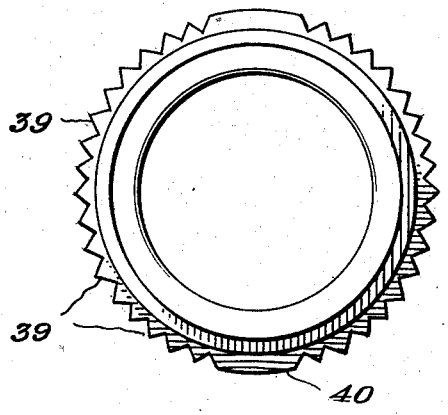
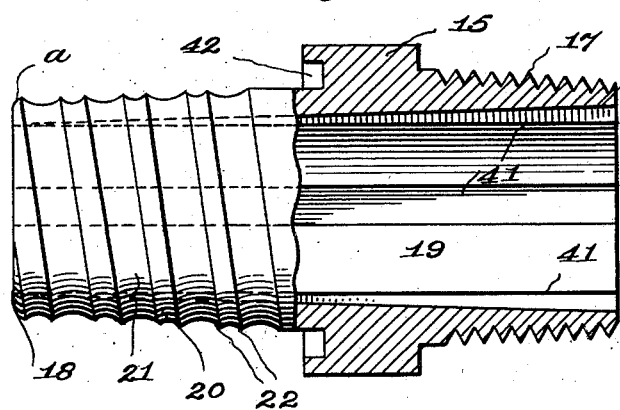
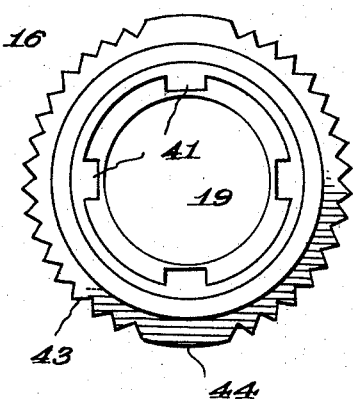
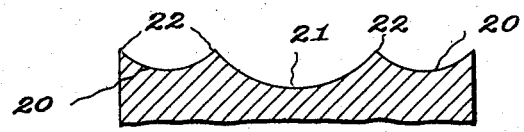
INVENTOR.
GUSTAVE A. BORG
BY
*a.w. Deller*
ATTORNEY.

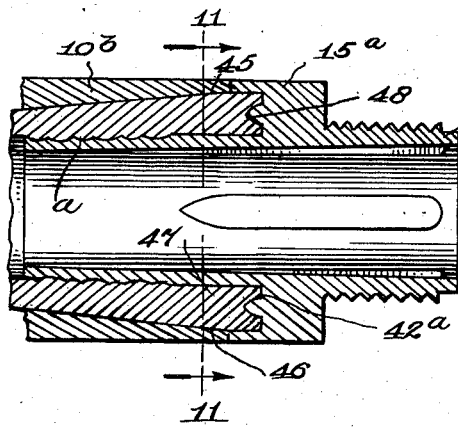
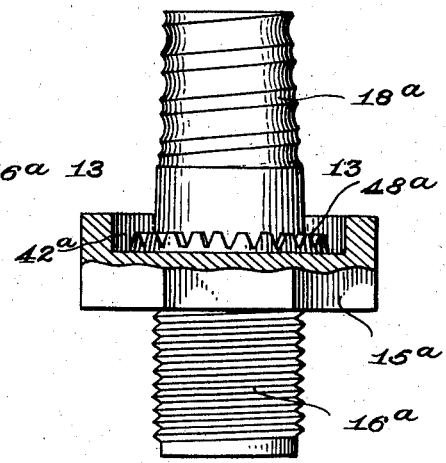
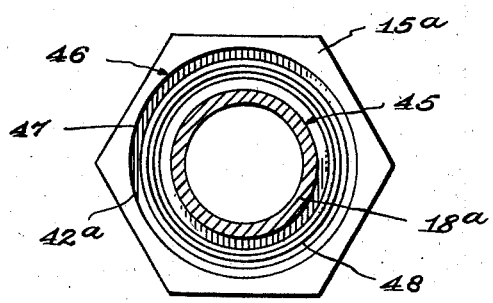
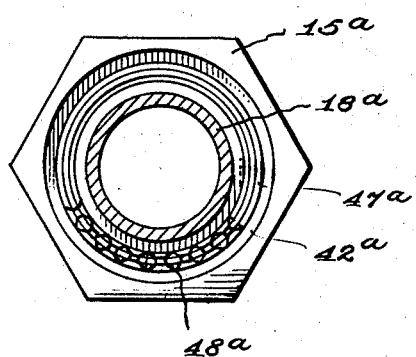

Patented Apr. 6, 1948

2,439,199

UNITED STATES PATENT OFFICE 2,439,199

COUPLING DEVICE

Gustave A. Borg, Naugatuck, Conn.

Application July 7, 1944, Serial No. 543,913

3 Claims. (Cl. 285—84)

The invention relates to coupling devices and more particularly to devices designed for connecting sections of hose with associated elements such as other sections of hose, tubes, receptacles, etc.

The invention has for its object to provide a coupling device of novel and distinctive construction which is capable of being combined with the section of hose or other element in a simple manner with maximum holding efficiency.

The invention contemplates further the provision of a novel coupling device of the indicated type which in addition to its functions as a coupling will adequately serve as a seal to efficiently prevent leakage without requiring the use of washers, packings or other extraneous means.

Other objects will appear from the description hereinafter and the features of novelty will be pointed out in the claims.

In the accompanying drawings, which illustrate examples of the invention, without defining its limits, Fig. 1 is a longitudinal section of the novel coupling device combined with a section of hose;

Fig. 5 is a longitudinal section on an enlarged scale showing a coupling nut which forms part of the novel coupling device;

Fig. 6 is an end view thereof;

Fig. 7 is an enlarged longitudinal section of a coupling connection included in the novel device;

Fig. 8 is an end view thereof;

Fig. 9 is a fragmentary sectional view on an enlarged scale, illustrating the novel thread embodied in the novel device;

Fig. 10 is a sectional view showing still another form of the novel coupling device;

Fig. 11 is a sectional view on the line 11—11 of Fig. 10;

Fig. 12 is an elevation partly in section, of another form of the novel device, and Fig. 13 is a sectional view on the line 13—13 of Fig. 12.

Figure 1:
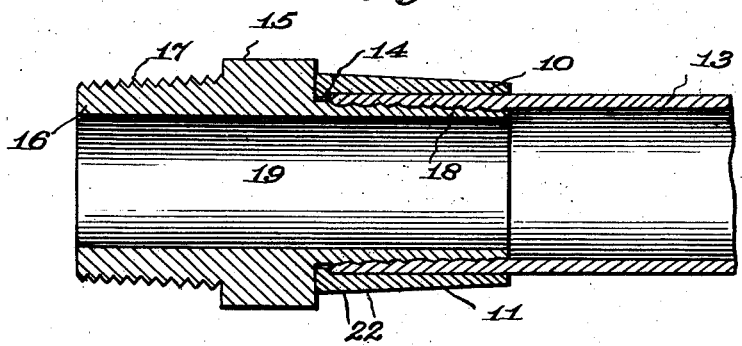
Figure 2:
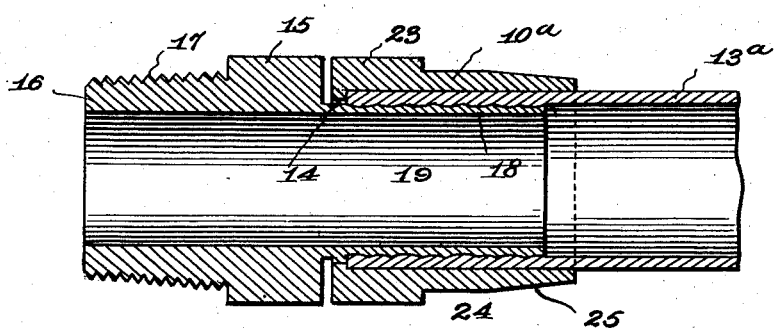
Fig. 2 is a similar view illustrating another form of the novel coupling device.

The coupling device in the form illustrated in Fig. 1 comprises a cylindrical locking sleeve 10 preferably having a tapering outer surface 11 and a smooth bore 12. The inner diameter of the bore 12 is predicated upon the outer diameter of the hose 13 for which it is designed and is always such as to cause the locking sleeve 10 to snugly fit over and upon the end of the hose 13. In the preferred form, as shown in Fig. 2, the locking sleeve 10 is provided at its outer end with an internal annular flange or shoulder 14 which is engaged by the end face of the hose 13 and whereby the movement of the locking sleeve 10 upon the hose 13 is arrested. In some instances, the shoulder 14, if desired, may be omitted.

In addition to the locking sleeve 10, the novel coupling device comprises a coupling connection which, in the form shown in Figs. 1 and 2, consists of an intermediate head 15 which may have its peripheral surface provided with flattened sections, or be hexagonal form, or otherwise shaped for the accommodation of an ordinary wrench, a spanner wrench or other suitable manipulating implements. From one side of the head 15, a tubular boss 16 projects in an axial direction, and preferably tapers externally toward its free end to a slight extent, and is provided exteriorly with screw-threads 17 which may be standard and of any conventional gauge. A second tubular boss 18 extends in the opposite direction from the other side of the head 15 in axial registry with the boss 16, and has an axial bore in registry with the bores of the head 15 and boss 16 to form a common bore 19 extending axially through the coupling connection.

Exteriorly, the second boss 18 preferably tapers somewhat toward its free end, and at said free end has an outer diameter dependent upon the inner diameter of the hose 13 for which it is designed, and which enables said second boss 18 to be introduced into the interior of said hose 13 at said open end in the manner and for the purpose to be more fully described hereinafter.

Upon its external preferably tapering surface the boss 18 is provided with a double or compound thread of novel and distinctive form. As shown in Fig. 7, the convolutions of the two threads extend spirally of the boss 18 in intermediate or intercoiled relation and comprise relatively narrow and shallow grooves 20 and relatively wider and deeper grooves 21 which together form spirally-extending ridges 22 located alternately in closer and wider spacing. The spiral grooves 20 and 21 preferably are curved in cross-section on predetermined arcs and depths which may depend upon the dimensions and other characteristics of the hose for which the coupling connection is designed. For instance, the grooves 20 may have a depth of approximately .024" at the deepest parts and be curved on a radius of approximately .052", and the grooves 21 may be approximately .040" in depth at the deepest parts and be curved on a radius of approximately .095". This arrangement is shown in detail in Fig. 9 and may, of course, be varied to meet the practical requirements under all conditions.

In utilizing the form of the coupling device under discussion any suitable sequence of operative steps may be followed in assembling the same. For instance, the locking sleeve 10 may be forced over and upon an end of the hose 13 preferably until the flange or shoulder 14 engages the end thereof as shown in Fig. 1. In its final position the locking sleeve 10 in such case is frictionally mounted exteriorly upon the hose 13, the interior bore of which is accessible at the one end of said locking sleeve 10. As the next step the free end of the boss 18 may be introduced into the end of the hose 13 at which the locking sleeve 10 is located and the coupling connection then rotated on its axis, for instance, through the medium of the head 15. Coincidentally with the rotation of the coupling connection, pressure is exerted thereon to force the boss 18 interiorly into the hose 13; in some instances the rotation may be dispensed with and the boss 18 may be axially pressed and manipulated into place in the hose 13. As rotation or equivalent manipulation under axial pressure takes place, the spirally-extending ridges 22 will, by acting on the material of the hose 13, progressively advance the boss 18 into the same until finally the head 15 engages the locking sleeve 10. In such case as with other suitable manipulations of the coupling connection, the boss 18 progressively advances into the hose 13 while the latter is fixed against spreading outwardly by the sleeve 10. As the progressive advance proceeds the relatively wider deeper grooves 21 will cause the hose material, because of its inherent flexibility, to flow, the flowed material being accommodated in the relatively narrower and shallower spiral grooves 20. At the same time any tendency to force the hose 13 outwardly which is developed by the boss 18 as it is inserted into position, is resisted by the locking sleeve 10. The flowing of the hose material into the grooves 21 results in a clamping force or gripping action which is increased by the flowed material in the grooves 20, and whereby the hose 13 is firmly and securely clamped in association with the coupling connection against separation by any normally developed forces. In the final stage, the boss 18 is fully inserted into the hose 13 with the head 15 and threaded boss 16 projecting from the end of said hose 13 in axial registry therewith ready for connection with a cooperating element such as another section of hose or the like, a nozzle, a faucet, etc.

The clamping action developed by the co-operation of the boss 18 and the locking sleeve 10 securely clamps the hose 13 and the coupling device in operative association with said hose. At the same time, the interlocking of the hose 13 with said boss 18 through the medium of the thread grooves 20 and 21 firmly fixes said coupling device in connection with said hose 13 against withdrawal therefrom as a result of pulling forces to which said coupling device may be subjected in practice.

The form of the novel coupling device illustrated in Fig. 2 differs from that shown in Fig. 1, in the type of the locking sleeve embodied therein.

In Fig. 2, the locking sleeve 10—a is designed to be combined with the hose 13—a in the same way as in the form first described. The locking sleeve 10—a is provided with a relatively wide annular external flange 23 which may have its peripheral surface flattened at one or more points or be otherwise constructed for the accommodation of a wrench or other implement. The body of the locking sleeve 10—a is partly cylindrical as indicated at 24 and partly tapering as shown at 25, and preferably is of such length as to extend beyond the end of the boss 18 when the latter is in place in the hose 13—a. The coupling connection used in association with the locking sleeve 10—a may be the same as shown in Fig. 1 and may be combined with the hose 13—a and sleeve or nut 10—a in the same way.

By extending the locking sleeve 10—a axially beyond the end of the boss 18, in the assembled condition of the device, the hose 13—a is prevented from flexing sharply and thereby is protected against breakage.

Figure 3:
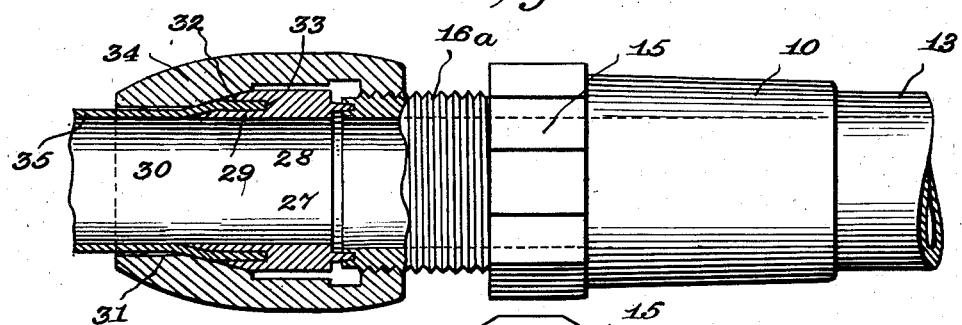
Fig. 3 is a view partly in section showing still another form of the novel coupling device in use for connecting two sections of hose with each other.
Figure 4:
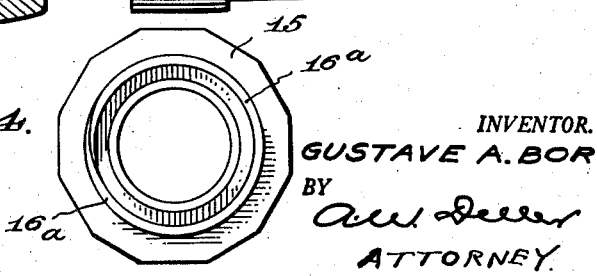
Fig. 4 is an end view of the coupling connection shown in Fig. 3.

As shown in Figs. 3 and 4, the locking sleeve 10 and the coupling connection 15 are the same as in Fig. 1 and are combined with the hose 13 in the same way. In the form now being described, the boss 16—a, which corresponds to the boss 16 of Figs. 1 and 2, is provided in its end face with an annular groove 26 for the accommodation of the annular shoulder 27 of a sealing, locking and gripping member or insert. The shoulder 27, which is bevelled or of other suitable form to snugly fit the groove 26, forms part of and projects from the tubular body 28 at one end of the insert, which body 28 comprises a cylindrical section 29 and a continuing bevelled section 30 tapering to a relatively sharp annular edge 31 at the other end of said insert. An external annular section 32 forms part of the body 28 and extends in an axial direction with its inner surface in spaced concentric relation with the cylindrical section 29 to form an annular gripping slot 33 having an open entering end. The external surface of the section 32 preferably is bevelled and connects with the inner concentric surface to form a relatively sharp annular edge 34 which is concentric with the cylindrical section 29. The annular bevelled section 32 preferably terminates at a point intermediate of the opposite ends of the insert so that the open entering end of the gripping slot 33 is located in registry with the cylindrical section 29.

In practice, the insert is combined with a tube or hose 35 which is designed to be coupled to the hose 13. The combination is effected by forcing the hose 35 over and upon the bevelled section 30 and cylindrical section 29 into the gripping slot 33 until the end of the hose 35 rests against the bottom thereof.

A pressure nut 36 internally-threaded for connection with the externally-threaded boss 16—a constitutes the medium whereby the coupling together or connection of the hose 13 and tube or hose 35 is completed. This pressure nut 36 is internally-threaded throughout only a part of its axial length and throughout the remainder of its axial length is internally provided with an inclined surface section 37 to constitute a locking section, and a continuing circular section 38. It will be understood that the pressure nut 36 is slipped over and upon the tube or hose 35 at an appropriate stage, for instance, prior to the connection of said tube or hose 35 with the insert.

To couple the hose 13 and the tube or hose 35 together, the pressure nut 36 is threaded upon the boss 16—a and screwed home. This causes the inclined surface section 37 of said nut 36 to bear against the annular bevelled section 32 and thereby forces the annular shoulder 27 into the groove 26 of the boss 16—a, and at the same time compresses the section 32 to thereby firmly clamp the tube or hose 35 against and upon the cylindrical section 29 of the insert. The resulting coupling together of the hose 13 and the tube or hose 35 not only firmly and securely unites the two, but at the same time provides a leak-proof connection of maximum efficiency.

In the form shown in Figs. 5 and 6 the locking sleeve 10—b is of tapering form and includes a relatively wide annular external flange 23—a which may be exteriorly knurled or otherwise roughened as indicated at 39, and provided with relatively smooth sections 40 located, for instance, at diametrically opposite points as shown in Fig. 6. On its interior surface the locking sleeve 10—b is provided with spiral small ribs 20—a and larger ribs 21—a extending spirally in intercoiled relation and dimensioned and shaped to complementally co-operate with the spiral grooves 20 and 21 respectively of the boss 18. The locking sleeve 10—b is combined with the hose or its equivalent in the manner previously described and co-operates with the coupling connection in the same way as set forth hereinbefore.

The coupling connection illustrated in Figs. 7 and 8 in addition to the elements mentioned previously includes inwardly-extending axial ribs 41 located, for instance, in pairs, at diametrically opposite points interiorly of the common bore 19. The ribs 41 have the opposed inner surfaces of each pair in parallel relation to each other and to the major axis of the bore 19 as shown in Figs. 7 and 8 and serve to strengthen the coupling connection. The latter has the one face of its annular head provided with an annular recess 42 surrounding the inner end of the boss 18 as illustrated in Fig. 7, for the reception of the end of the associated hose when the latter is combined with the boss 18. The outer peripheral surface of the head 15 may be knurled or otherwise roughened as shown at 43 and may be provided with smooth sections 44 located for instance at diametrically opposite points as shown in Fig. 8.

The form of the novel coupling device shown in Figs. 10 and 11 comprises a coupling connection similar to the one illustrated in Figs. 7 and 8 and including a head 15—a of hexagonal or other polygonal form as shown in Fig. 11.

An externally-threaded boss 16—a extends axially in one direction from the head 15—a and preferably tapers exteriorly toward its free end. A second boss 18—a, corresponding to the previously mentioned boss 18, projects axially in the opposite direction from the head 15—a in axial registry with the boss 16—a as shown in Fig. 10. The second boss 18—a extends from the bottom of annular recess 42—a located in the one face of the head 15—a, and at its base is provided with a cylindrical flat surface 45 of predetermined axial width and extending axially up to the compound thread. The latter consists of the spiral grooves 20 and 21, and spirally-extending ridges 22 provided upon the external preferably tapering surface of the boss 18—a. The outer surface 46 of the recess 42—a is also flat and is located in spaced concentric parallelism with the surface 45 of the second boss 18—a. An annular projection 47, preferably of truncated V-shape in cross-section, projects from the bottom of the recess 42—a and includes an annular edge 48 in concentric intermediate relation to the respective surfaces 45 and 46 as shown in Figs. 10 and 11.

As the hose 13—b is forced home on said boss 18—a, the end thereof will be located in the annular recess 42—a in engagement with the annular projection 47 and forced over the same into contact with the bottom of said recess 42—a. Because of the cross-sectional shape of the projection 47 it will exert a camming action on said hose 13—b whereby the latter will be expanded into firm engagement with the flat surfaces 45 and 46 and bind itself in said recess 42—a to thereby provide an efficient leak-proof connection between the hose and the coupling device at this point.

The hose is fixed in place on the boss 18—a by means of a locking sleeve 10—b such as shown in Fig. 4, the spiral ribs 20—a and 21—a of which co-operate with the compound thread 20, 21 of the boss 18—a to force the hose 13—b lengthwise thereof into the annular recess 42—a in engagement with the annular projection 47 therein, and to firmly clamp said hose 13—b in place on the boss 18—a.

The form of the coupling shown in Figs. 12 and 13 is substantially the same as the one illustrated in Figs. 10 and 11, with the exception that the annular projection 47—a, which corresponds to the projection 47, is provided with a serrated or toothed edge 48—a corresponding to the annular edge 48 of Figs. 10 and 11.

As the end of the hose 13—a engages the serrated or toothed edge 48—a, the serrations or teeth of the latter will exert a gripping action on said hose 13—a whereby the latter is held against rotation relatively to the projection 47—a, boss 18—a, head 15—a and the locking sleeve 10—b as the latter is screwed into its operative position.

With this arrangement distortion of and injury to the hose 13—a is prevented by the rotative action and forces of said locking sleeve 10—b.

In the preferred forms of the novel coupling device, as shown in Figs. 4, 5, 6, 7, 10, 11, 12, and 13, the angle of taper of the outer surface of the boss, such as 18 and 18—a, is different from the angle of taper of the inner surface of the locking sleeve such as 10—b. As a result of this arrangement an effective grip will be created throughout the entire axial length of the locking sleeve and the associated boss. This brings about complete operative contact between the hose 13—b and the boss 18—a and the locking sleeve 10—b which results in a grip of maximum effectiveness and at the same time seals the connection between the hose and the coupling device against leakage.

Furthermore, it is preferred in all forms of the novel coupling device to provide the second boss with a rounded peripheral edge, as shown at $a$ in Fig. 7, to prevent catching of the hose, or other unintentional interference therewith at this point. The rounded edge $a$ furthermore facilitates the connection of the coupling device with the hose or its equivalent.

In all of its forms the novel coupling device is simple in construction, easily applied without requiring any particular skill, and of maximum efficiency in operation.

The device, if desired, may be made of a wide variety of materials, such as plastics, metal, wood, rubber, fiber, synthetics, paper, ceramics, glass, etc., or combinations of these and other materials.

Although the present invention has been described in conjunction with preferred embodiments, it is to be understood that modifications and variations may be resorted to without departing from the spirit and scope of the invention as those skilled in the art will readily understand. Such variations and modifications are considered to be within the purview and scope of the claims.

I claim:

1. In a hose coupling comprising a coupling connection including a tubular boss adapted to extend into an end of a hose, means for securing said boss in said hose comprising a gradually, continuously and progressively expanding, external compound screw thread on said boss, said thread consisting of helical convolutions of alternately relatively narrow, shallow grooves and relatively wider, deeper grooves together forming helically-extending ridges located in intercoiled relation alternately in closer and wider spacing for helically gripping said hose interiorly, and a locking sleeve located exteriorly on said hose in registry with said boss and cooperating with said compound thread to fix said coupling connection against unintentional withdrawal from said hose under developed pulling forces.

2. In a hose coupling comprising a coupling connection including a tubular boss adapted to extend into an end of a hose, means for securing said boss in said hose comprising a gradually, continuously and progressively expanding, external compound screw thread on said boss, said thread consisting of helical convolutions of alternately relatively narrow, shallow grooves and relatively wider, deeper grooves together forming helically-extending ridges located in intercoiled relation alternately in closer and wider spacing and helically gripping said hose interiorly, a locking sleeve located exteriorly on said hose in registry with said boss, and spiral ribs of relatively different widths interiorly of said locking sleeve in intercoiled relation cooperating with the respective grooves of said compound thread to fix said coupling connection against unintentional withdrawal from said hose under developed pulling forces.

3. In a hose coupling comprising a head having an axial bore and provided on one face with an annular recess, and a tubular boss extending from the recessed surface of said head in axial registry with the bore thereof, said boss having a cylindrical surface at its base in concentric parallelism with the outer annular surface of said recess, means for securing said boss in a hose comprising a gradually, continuously and progressively expanding, external compound screw thread on said boss, said thread consisting of helical convolutions alternately of varying width and depth located in intercoiled relation for helically gripping said hose interiorly with the end of said hose in said annular recess and an annular projection in said annular recess provided with a serrated annular edge for engagement with the end of the hose to prevent rotation thereof relatively to the coupling.

GUSTAVE A. BORG.

REFERENCES CITED

The following references are of record in the file of this patent:

UNITED STATES PATENTS

| Number | Name | Date |
|---|---|---|
| 1,929,905 | Slotsky | Oct. 10, 1933 |
| 1,974,383 | Wallace | Sep. 18, 1934 |
| 1,985,494 | Gish | Dec. 25, 1934 |
| 2,216,839 | Hoffman | Oct. 8, 1940 |

FOREIGN PATENTS

| Number | Country | Date |
|---|---|---|
| 376,410 | Italy | Nov. 14, 1939 |